Figure 1:
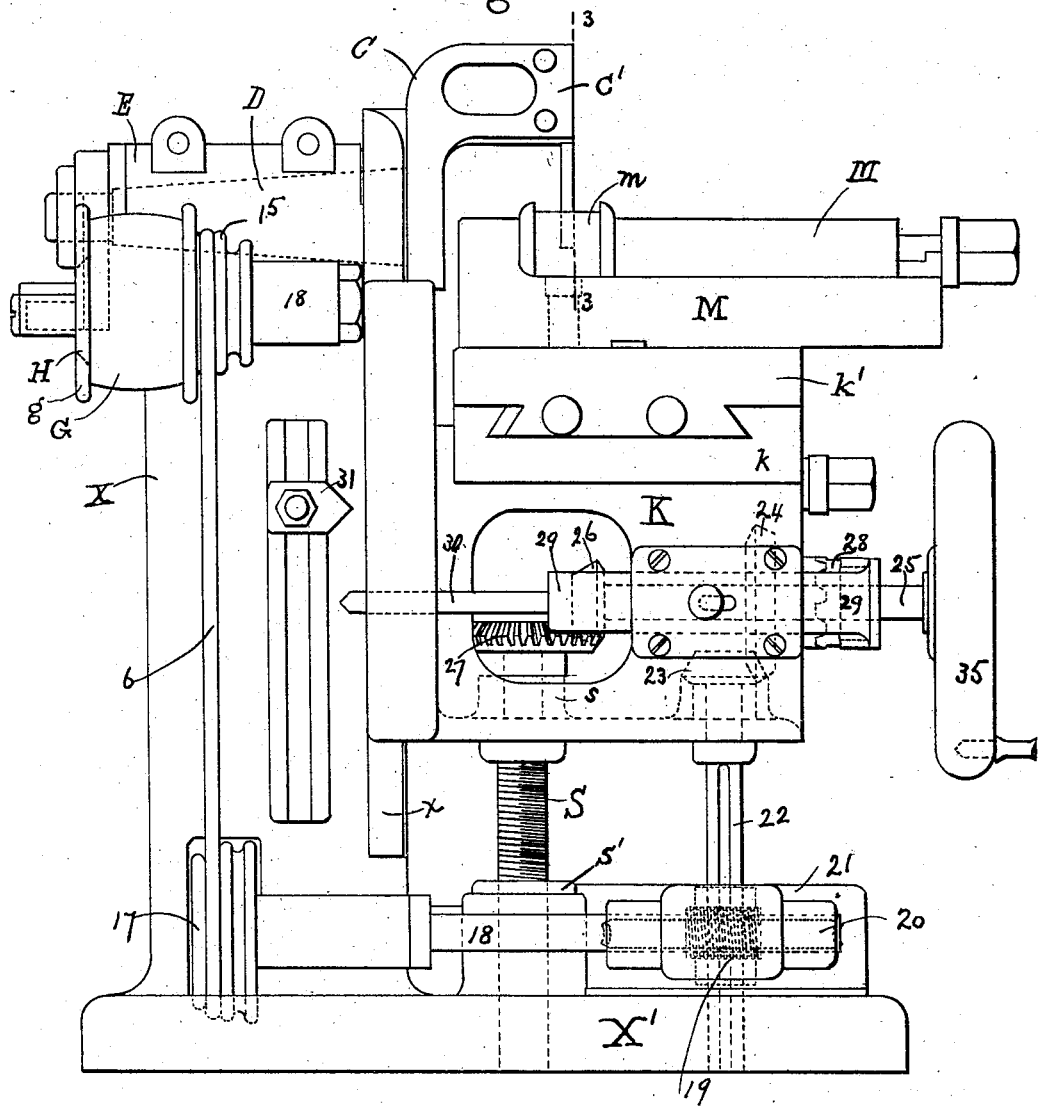

No. 735,605. PATENTED AUG. 4, 1903.
W. J. SMITH.
MILLING MACHINE AND TOOL.
APPLICATION FILED APR. 14, 1903.
NO MODEL. 3 SHEETS—SHEET 2.
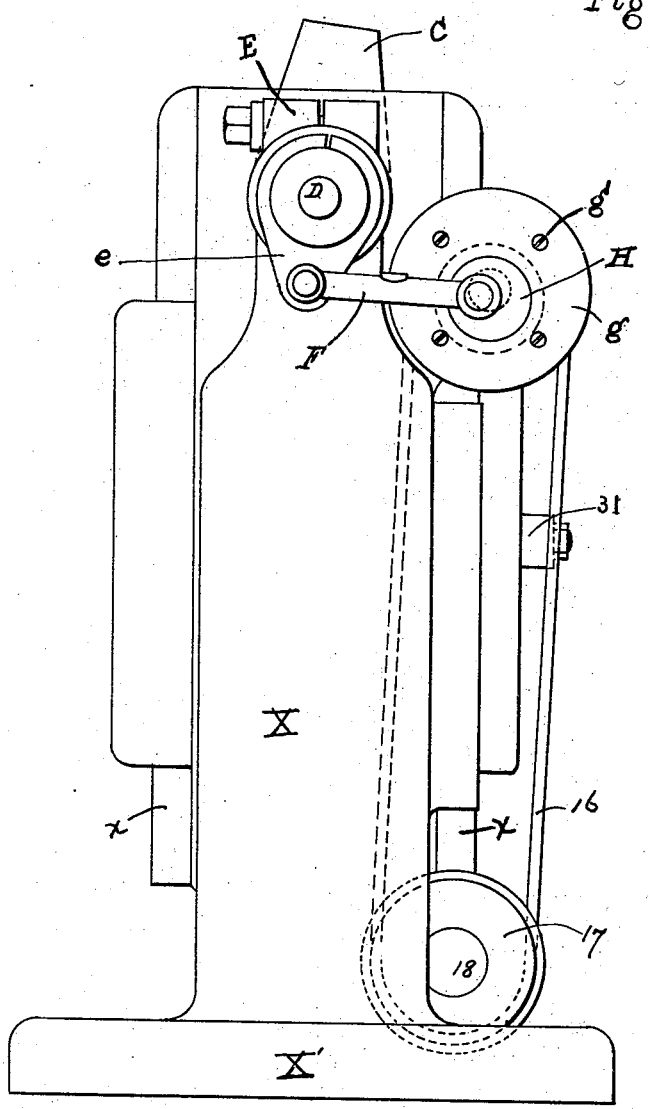
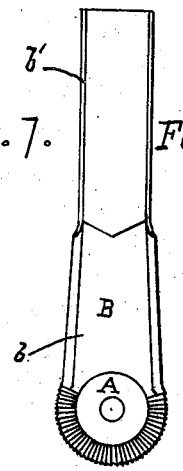
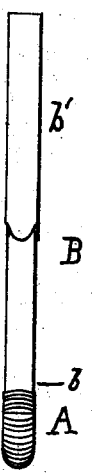
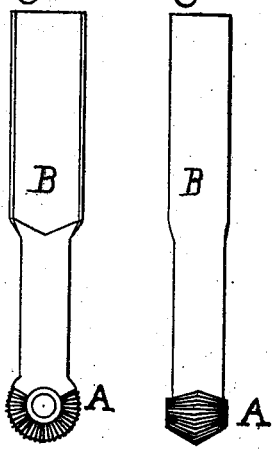
WITNESSES
Walter Abbr
F.W. Wright
INVENTOR
William John Smith.
BY
Howtar and Howtar
ATTORNEYS No. 735,605. PATENTED AUG. 4, 1903.
W. J. SMITH.
MILLING MACHINE AND TOOL.
APPLICATION FILED APR. 14, 1903.
NO MODEL. 3 SHEETS—SHEET 3.
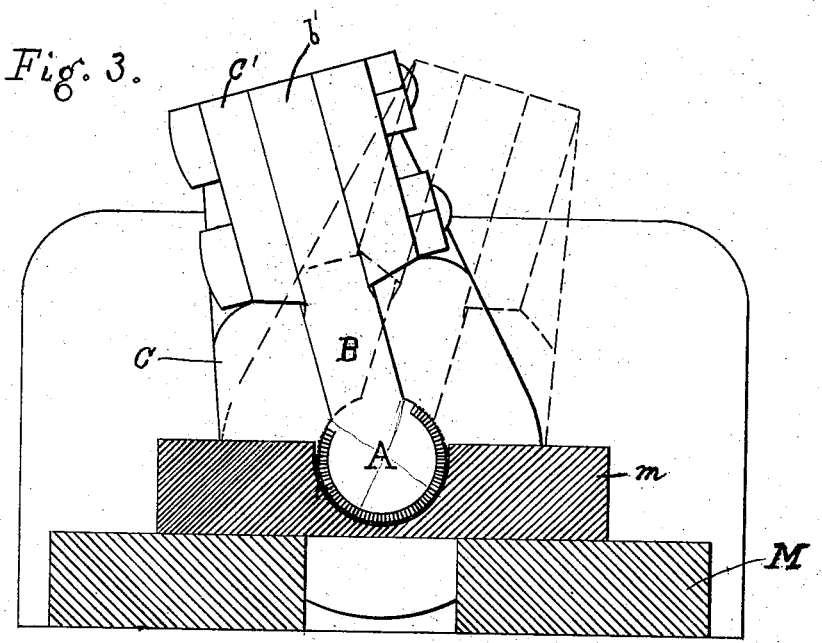
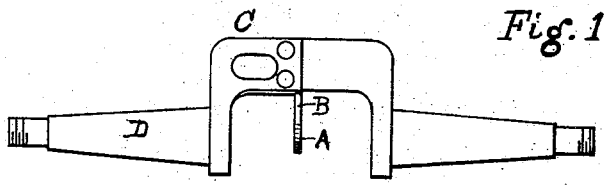
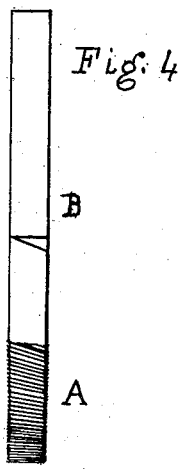
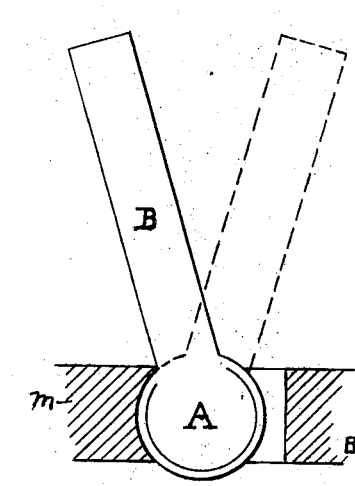
WITNESSES
P. W. Wright.
Walter Abbs.
INVENTOR
William John Smith
BY
Howson and Howson
ATTORNEYS No. 735,605. Patented August 4, 1903.

UNITED STATES PATENT OFFICE.

WILLIAM JOHN SMITH, OF NEW HAVEN, CONNECTICUT, ASSIGNOR TO WM. J. SMITH COMPANY, OF NEW HAVEN, CONNECTICUT, A CORPORATION OF DELAWARE.

MILLING MACHINE AND TOOL.

SPECIFICATION forming part of Letters Patent No. 735,605, dated August 4, 1903.

Application filed April 14, 1903. Serial No. 152,576. (No model.)

*To all whom it may concern:*

Be it known that I, WILLIAM JOHN SMITH, a citizen of the United States, residing in New Haven, in the county of New Haven, State of Connecticut, have invented an Improved Milling Machine and Tool, of which the following is a specification.

The main object of this invention is to so construct a milling-machine and its tool for working on metal and other materials that such machine and tool may be employed to cut slots entirely through the material with greater accuracy and with greater speed than slotting-machines as usually constructed.

In the accompanying drawings, Figure 1 is a side elevation of a milling-machine embodying the invention. Fig. 2 is a rear view of the same. Fig. 3 is an enlarged sectional view on the line 3 3, Fig. 1. Fig. 4 is an edge view, and Fig. 5 a top plan, of the form of tool shown in Figs. 1 and 3. Fig. 6 is an outline of the form of slot cut by the tool, Fig. 4. Fig. 7 is a face view, and Fig. 8 an edge view, of a modified shape of milling-tool. Fig. 9 is an outline of the shape of slot cut by the tool, Fig. 7. Fig. 10 is a face view, and Fig. 11 an edge view, of another form of milling-tool to cut a slot of the outline shown in Fig. 12. Fig. 13 is a view, drawn to a smaller scale, of a modified construction of machine; and Fig. 14 is a view illustrating a special cutting operation which can be accomplished by this invention.

My invention is especially intended for use in metal-working, and is designed primarily to provide a means for quickly, accurately, and perfectly cutting slots through pieces of metal. Slotting-machines as usually constructed have reciprocating cutting-tools with planer action, the metal being previously drilled through to permit the slotting-tool to finish the slot to the desired shape. This planer mode of slotting is a slow operation, and it requires considerable care and skill to finish the walls of the slot accurately.

I have devised a milling machine and tool which can be used for cutting slots of various outlines or shapes accurately, quickly, and economically.

My invention consists in so constructing and mounting the milling-tool and imparting an oscillating movement to it that the oscillating axis of the cutter may pass entirely through the metal in which the slot is to be cut. For this purpose instead of making the cutter a complete circular disk to be mounted on the end of a spindle with a straight axis, as is the practice with rotary milling-tools, I make the toothed cutter something less than a complete circle, preferably a little more than a semicircle, and I attach it to or make it in one with a shank in the plane of the cutter. This carrying-shank projects from what may be designated as the "untoothed" side of the cutting part of the disk and serves to mount the cutting-tool in a cranked part of the operating-shaft, to which I impart a rapid oscillating motion. The axis of motion of the cutting part of the tool is in line with the axis of motion of the oscillating operating-shaft.

The construction of the tool itself will be understood on reference to Figs. 2, 3, 4, and 5 of the drawings, in which A represents the cutting-disk part toothed for about three-fourths of its periphery, while B represents the carrying-shank projecting from the fourth quarter of the disk and in the plane of the disk at right angles to the axis of the latter. The shank is preferably formed in one piece of metal with the cutter, but at any rate is rigid therewith. The opposite faces of the toothed part of the milling-disk are toothed near the edge, as is common in rotary milling-tools. The part $b$ of the shank adjacent to the cutting-disk part is made of less width than the diameter of the cutting-disk and of less thickness than the thickness of the disk, while the outer end $b'$ of the shank may be provided with beveled edges, so that it may be conveniently gripped in a tool-clamp C', Fig. 3. To the tool thus constructed and mounted such an oscillating motion is imparted, as indicated by full and dotted lines in Fig. 3, with the center of the cutter part A as the axis of oscillation, that the cutter and a part of the shank are free to pass into a slot cut by the tool in the metal $m$ sufficiently far to permit the axial center of the cutter to pass entirely through.

As shown in Figs. 1 and 3, I mount the tool in a crank-arm C on a shaft or spindle D, which is indicated by dotted lines in Fig. 1 as a tapering spindle mounted in a suitable bearing E in the frame X of the machine. The cutting-tool is so mounted in this crank-arm that the center or axis of the toothed disk of the cutting-tool shall be in line with the axis of this shaft D, the plane of the cutting-disk lying at right angles to said axis. To this shaft D, I impart an oscillating movement by any suitable means. The degree of oscillation will necessarily vary with the depth of the slot to be cut. Thus for a relatively deep slot the degree of oscillation will have to be less than for a relatively shallow slot in order that the shank of the tool as the slot is being cut through may not strike the ends of the slot at the upper part. For the same reason the part $b$ of the shank is reduced in width of course. As a convenient way of imparting oscillating movement to the shaft, its crank-arm, and tool I have shown, attached to the rear end of the shaft, a crank $e$, joined by a connecting-rod F to a crank-pin on a rotating wheel G, which in this case is shown as a belt-pulley to which a power-belt may be applied. As a convenient means of varying the extent of throw or degree of oscillation I have shown in Fig. 2 the crank-pin of the wheel G as eccentrically mounted on a disk H, which itself is eccentrically mounted in the end of the wheel G, so that it may be rotarily adjusted on the wheel to different positions and clamped in its adjusted position. As a convenient way of clamping the crank-pin disk H to the wheel G the end plate $g$ of the wheel or pulley G may be formed with an eccentric undercut opening, as indicated by dotted lines in Fig. 1, and the disk H may be set into this end plate from inside, the periphery of the disk H being correspondingly beveled to fit into the undercut part of the plate $g$, so that on tightening the screws $g'$, Fig. 2, by which the plate $g$ is secured to the wheel G, the crank-disk H may be clamped in the position to which it has been adjusted.

In carrying my invention into effect the machine may be so constructed as to either feed the work to the tool or the tool to the work, as is common in milling and other machines; but in the drawings I have illustrated a construction in which the work-table K is adapted to be traversed to move the work up to the tool. While I do not limit myself to any particular construction of mechanism for this purpose, I have shown in the drawings one construction which may be used. On vertical guides $x$ on the standard or frame of the machine is guided a vertically-movable work-table K, in the upper part of which are mounted the usual beds $k$ $k'$, adjustable horizontally at right angles to each other, the upper bed $k'$ carrying a suitable clamping means M for the piece $m$, in which the slot is to be cut.

The feed-motion is no part of my present invention, and I do not limit myself to any particular construction of feed-motion; but in Figs. 1 and 2 I have illustrated generally a feed-motion which may be employed. In bearings $s$ in the lower part of the movable table there is mounted a vertical feed-screw S, passing through a fixed nut S' in the base X' of the frame. Rotary motion may be imparted to this feed-screw from the pulley G through the following instrumentalities, namely: belt 16 from the grooved pulley 15 to the corresponding grooved pulley 17 on horizontal shaft 18, which at the other end carries a worm 19, (shown by dotted lines in Fig. 1,) gearing into horizontal worm-wheel 20, mounted in a box-bearing 21 on the base X' and through which passes the vertical splined spindle 22, turning in a bearing in the table K. This spindle 22 carries at its upper end a bevel-pinion 23, gearing into a bevel-pinion 24 on a horizontal spindle 25, mounted in bearings in the table K and carrying at its inner end a bevel-pinion 26, gearing into a bevel-pinion 27 on the upper end of the feed-screw S.

The parts marked 28, 29, 30, and 31 are parts of an automatic stop-motion, which forms no part of my present invention and which I will therefore not attempt to describe.

A hand-wheel 35 on the outer end of the spindle 25 may be used to move the work-table up or down by hand.

In the construction of tool shown in Figs. 3, 4, and 5 the cross-section of the cutting edge is rectangular, so that the cutter will cut an oblong slot of the outline illustrated in Fig. 6; but the cutting edge may be varied as to its cross-section. Thus in Figs. 7 and 8 I have illustrated a cutter the edge of which is of rounded cross-section, so that it will cut a slot with rounded ends, as shown in Fig. 9. In Figs. 10 and 11 I have shown another form of cutter, which, as will be readily understood, is adapted to cut a hole of hexagonal shape, as indicated in Fig. 12. In all cases the toothed edge of the cutter is on the arc of circle preferably a little more than a semicircle, as shown in Figs. 3, 7, and 10.

While for ordinary purposes and work of but limited size the oscillating shaft having the tool-carrying crank may be at one side only of that crank, it may be desirable in some cases to provide a bearing for the shaft on both sides of the cutting-tool, as will be readily understood on reference to the modification shown in Fig. 13.

From the foregoing description it will be understood that by imparting a rapid oscillating motion to the cutting-tool I can cut slots in metal or other material speedily, accurately, and economically and with the walls of the slot perfectly finished and without danger of breaking or damaging the metal, no matter if the slot be of considerable width in relation to the width of the metal piece to be cut.

Another advantage which my invention possesses is that it may be employed to cut a rounding seat in the end of the slot, as will be readily understood on reference to Fig. 14.

I claim as my invention—

1. The herein-described milling-tool, having a cutter with a toothed edge on the arc of a circle and a carrying-shank rigid with and in the plane of the cutter, at right angles to the axis of the latter, the part of the shank adjacent to the cutter having less thickness than the toothed cutter part.

2. The herein-described milling-tool having a disk-like cutter with a toothed edge on the arc of a circle and a shank projecting from the edge of the cutter and rigid with and in the plane of the latter, the shank adjacent to the cutter being of less thickness than the cutter, while the outer end of the shank has beveled edges to be held in a tool-clamp.

3. The herein-described milling-tool, consisting of a disk-like cutter with a toothed edge on the arc of a circle and a carrying-shank rigid with and in the plane of the cutter, at right angles to the axis of the latter, the shank being of less width and of less thickness than the cutter.

4. The herein-described milling appliance, consisting of a cutter having a toothed edge on the arc of a circle, on the axis of which it can oscillate, and a carrying-shank rigid with and in the plane of the cutter, at right angles to the axis of the latter, in combination with means for imparting oscillating motion to the cutter about its own axis, the cutter being free to pass into the material beyond such axis.

5. The herein-described milling appliance, consisting of a cutter with a toothed edge on the arc of a circle, on the axis of which the cutter can oscillate, and a carrying-shank in the plane of the cutter at right angles to the axis of the latter, in combination with a shaft having a crank-arm to which the shank of the cutter is attached and means for imparting an oscillating motion to the crank-shaft.

6. The herein-described milling appliance, consisting of a cutter with a toothed edge on the arc of a circle, on the axis of which the cutter can oscillate, and a carrying-shank in the plane of the cutter at right angles to the axis of the latter, in combination with a shaft having a crank-arm to which the shank of the cutter is attached, means for imparting an oscillating motion to the said shaft and adjusting means whereby the degree of oscillation may be varied.

7. The herein-described milling appliance, comprising a cutter with a toothed edge on the arc of a circle, on the axis of which the cutter can oscillate, and a carrying-shank in the plane of the cutter at right angles to the axis of the latter, in combination with a shaft having a crank-arm to which the shank of the cutter is attached, means for imparting an oscillating motion to the shaft, the axis of the cutter being in line with the axis of oscillation of the shaft.

In testimony whereof I have signed my name to this specification in the presence of two subscribing witnesses.

WILLIAM JOHN SMITH.

Witnesses:
HUBERT HOWSON,
F. WARREN WRIGHT.